United States Patent Office 2,758,813
Patented Aug. 14, 1956

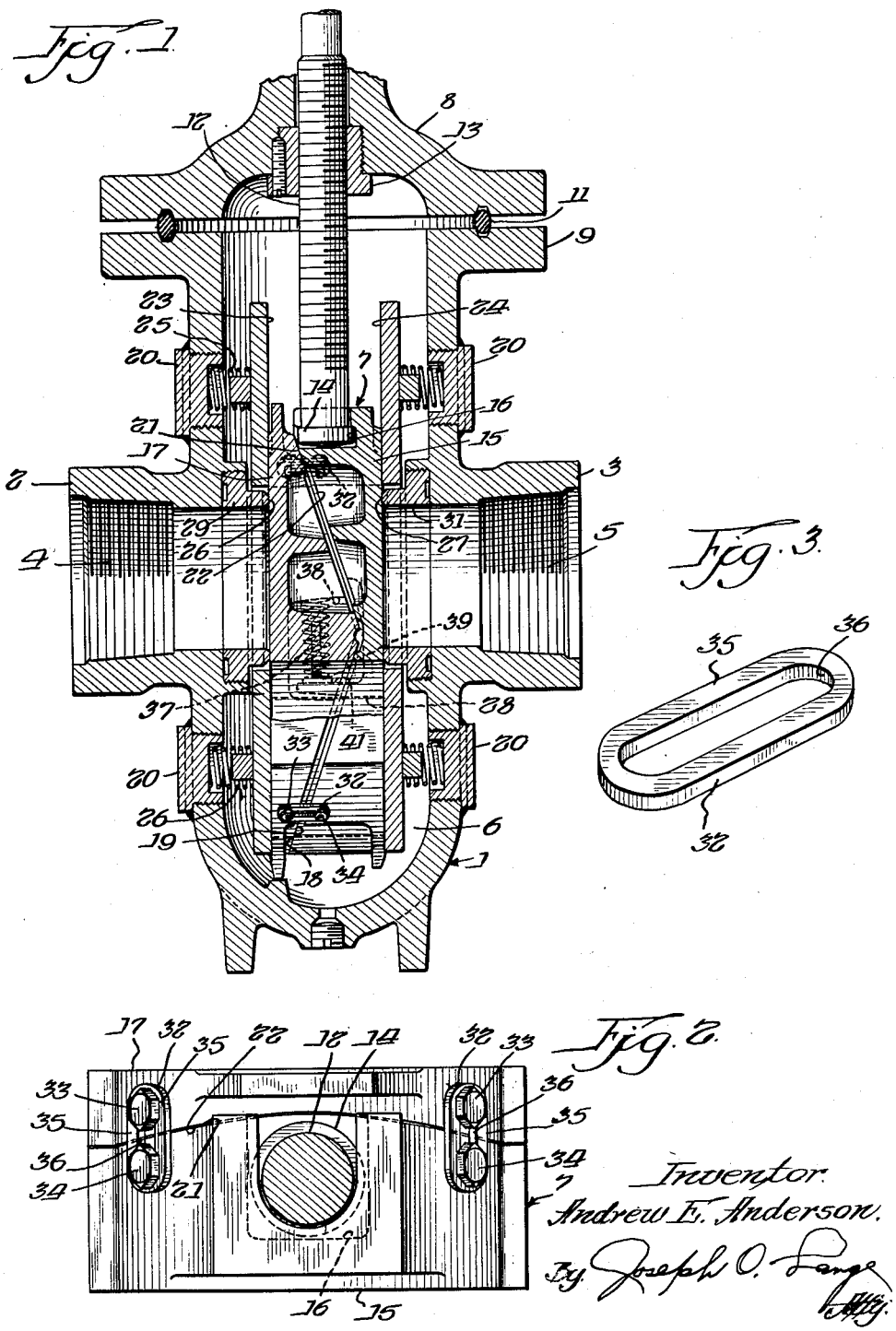

2,758,813

LINK MECHANISM FOR CONDUIT VALVES

Andrew E. Anderson, Berwyn, Ill., assignor to Crane Co., Chicago, Ill., a corporation of Illinois Application August 31, 1951, Serial No. 244,658

2 Claims. (Cl. 251—167)

This invention relates to conduit type gate valves, and, more particularly, it is concerned with an improvement over the type of valve shown in U. S. Patent #2,507,924, issued April 18, 1950.

At the outset, in order to obtain a better understanding of the background of this invention, it should be understood that in the conduit type of valves in which a pair of discs are placed in back-to-back or juxtaposed relation with converging angularly disposed surfaces defining such relationship, the matter of properly supporting the disc halves is a critical and an important one, particularly realizing that in this type of valve one disc half termed the stem half carries or supports the other disc half which is termed the floating disc. Heretofore, a significant objection in this structure has been the inability to properly and accurately hold the floating half with relation to the stem half of the disc, since the discs were not positively held together previously.

Therefore, it is one of the more important objects of this invention to overcome prior objections of sticking and outwardly tilting of the discs by the employment of a novel link mechanism. Both the disc and the closure member are held thus together as a single unit when the valve is being assembled.

Another important object is the use of the link mechanism hereinafter described to keep the disc halves from canting outwardly beyond the gauge or body seat dimension when the conduit valve is in the open position and thus preventing any possibility of the discs binding or sticking on the body seat ring when the valve is being closed.

Another object is to provide for a construction in a link mechanism which permits of assembling the disc halves when in a collapsed position; that is, with the upper and lower oppositely disposed wedge surfaces in full contact simultaneously, the links thereby permitting a limited up and down movement of either disc.

Other objects and advantages of this invention will become apparent upon proceeding with a description read in light of the accompanying drawings, in which—

Fig. 1 is a fragmentary sectional assembly view of one form of my invention applied to a conduit valve.

Fig. 2 is a plan exterior view of the discs alone when assembled.

Fig. 3 is an exterior perspective view of one form of link employed.

Similar reference numerals refer to similar parts throughout the several views.

Referring now to Fig. 1, a valve casing, generally designated 1, is shown having the usual inlet and outlet connections 2 and 3 for attachment to a pipe line as indicated by means of the threads 4 and 5. The valve is provided with a central chamber 6 therebetween within the casing to receive a closure member generally designated 7. At the upper end of the valve chamber 6, a bonnet 8 is attached by means of bolts (not shown) to the bonnet flange 9 and is held in fluid sealing relation therewith by means of the ring gasket 11. Projecting through the bonnet 8, a stem 12 is journalled in the stem hole bushing 13, the latter member being non-rotatably mounted as indicated.

A handwheel (not shown) is used to suitably rotate the stem upon the threads indicated so as to effect a reciprocating motion to the stem and disc 7, the latter with the half 15 having a stem head 14 which engages the stem half of the said disc half 15 suitably recessed as at 16 to receive the said stem head.

The closure member 7 also consists of the floating half 17, both halves, as shown, having therebetween for wedging purposes upon predetermined movement the inclined converging contact wedge surfaces 18 and 19 at the lower half portion and the surfaces 21 and 22 at the upper half portion. The assembled closure member is guided by means of the oppositely disposed guide members 23 and 24, resiliently mounted at their upper and lower end portions by means of the coil springs 25 held in place by plugs 20. Other detailed descriptions of such latter features are not necessary, since this is a part of the subject matter of the patent above referred to. Each of the disc halves make contact at the annular raised seats 26 and 27 in the closed position which is the position illustrated, while, in the open position, each of the halves being ported, as indicated by the dotted lines, defines the complementary through-port 28 in the open or raised position of the valve.

As previously referred to above, it has been found desirable for proper valve operation and avoidance of unnecessary wear to keep the disc halves from tipping outwardly beyond the body seat dimensions defined by the respective surfaces 26 and 27 when the valve is in the open position. It is desirable also to facilitate easier assembly and to prevent the discs sticking on the body seat rings 29 and 31 when the valve is being closed.

By this invention, such objectives are accomplished by the use of the links 32 mounted as indicated in Fig. 2 upon the spaced-apart cap screws 33 and 34 respectively mounted on the floating half and stem half of the closure member which snugly hold the links 32 as indicated in the dotted lines at the upper half portion and in the solid lines at the lower portion by means of the respective cap screws 33 and 34. The cap screws bear snugly against the upper surface of the links, as indicated at 35, the curved end surfaces 36 thereof determining the spaced apart dimension of the said cap screws as hereinafter explained.

In order to accomplish the above assembly, a very close or snug fit is thus obtained between the cap screws and the inside bearing defined by the perimetral surfaces 36. This is best obtained by assembling both halves 15 and 17 of the disc 7 when in a collapsed position and preferably when not assembled within the valve. That is, it is preferable to mount one disc half superposed over the other to provide a full contact simultaneously between the surfaces 18 and 19 and 21 and 22. At this time, the links 32 are fitted to the discs, so that the cap screws 33 and 34 thus fit snugly against the end surfaces defined by the perimetral surface 36. This insures obtaining the proper close fit between the inside surfaces of the links and the cap screws, while the discs are in the collapsed position. Between the disc halves on suitable shoulders on each side of the vertical centerline of the valve (when viewed transversely), resilient members or coiled springs 37 are preferably interposed (only one is shown) shouldering at its upper portion upon a ledge 38 on the closure half 17 and at its lower end portion shouldering on the stud 39 weldably or otherwise secured to the ledge 41 of the stem half 15 of the closure member 7. The purposes of the springs 37 are to function as a counterbalance for the floating disc half 17 to allow generally for a slight axial spread-apart movement of the floating half of the disc with relation to the stem half upon moving the closure member from open to closed position or vice versa and thus aid in improved valve operation.

It should be appreciated that when the valve is fully opened or closed, the discs are wedged outwardly approximately a total of one sixty-fourth of an inch, the disc faces making contact with the seat faces at 26 and 27. It has been found that there is sufficient resilience or give in the link and the cap screws to permit the desired spreading of the discs and the links also permit a limited up or down movement of either disc half relative to the other.

It has also been found that this design principle is effective if the links 32 or the cap screws 33 and 34 take a permanent set to the maximum body seat dimension, or if the materials thereof are such as to permit a certain amount of elasticity which will have a tendency to hold the discs in a slightly collapsed position when the valve is being operated.

It should be clear, of course, that the links 32 may be of the shape as illustrated or of any other suitable form, such as round or square, and they may be composed of various materials depending on the service condition for which the valve is to be used.

It should, of course, be clear further that while only a single embodiment is shown and described, the invention is capable of being used in a number of different forms as defined by the claims appended hereto interpreted in light of the prior art.

I claim:

1. In a conduit valve comprising a casing having oppositely disposed body seat portions and a closure member having an actuating disc half and a floating disc half in back-to-back relation for engaging the body seat portions, each of the said closure disc halves having therebetween converging inclined surfaces serving as wedging means to cause said disc halves to be spread apart transversely slightly upon movement thereof to seated position in either the closed or open position of the valve, means for limiting the space between the said converging inclined surfaces of the said disc halves and preventing the said disc halves from tilting outwardly beyond the body seat dimensions of the valve when the latter is in the open position, each of said discs having oppositely disposed projecting portions thereon, the said space limiting means consisting of links snugly attached to said oppositely disposed projecting portions of the said disc halves, the said links being attached to the projecting portions so as to permit of no relative movement between the said links and said projecting portions, the said links being of elongated slotted form and constructed of a material possessing suitable elasticity thereby to permit only a slight axial spread apart movement of the floating disc half and the actuating disc half upon movement of the said closure member from open to closed valve position and vice versa and stretching of the links.

2. In a conduit type of valve comprising a closure member consisting of a pair of disc halves, oppositely disposed seats therefor spaced apart, the said disc halves being placed in back-to-back relation to each other, one of said discs being the actuating portion of the closure member, each of said disc halves having therebetween converging inclined surfaces relative to a vertical plane serving as wedging means therebetween upon relative axial movement of one of said disc halves, said disc halves having relatively slight transverse movement upon movement on the said inclined surfaces, means for limiting the latter transverse movement comprising snugly mounted substantially annular means on outer surfaces on each of said closure disc halves respectively with one end portion of the annular means being mounted on one disc half portion and the other end on the other disc half portion, projecting means on the outer surfaces of the said disc halves closely engaging inner end surface limits of said annular means at said respective end portions thereof, the said snugly mounted annular means spanning substantially transversely the converging surfaces between each disc half at at least one end portion thereof, resilient means interposed between each disc half normally tending to effect said slight transverse movement between the said disc halves when the latter are unseated, the said annular means being fixedly mounted relative to the disc halves and stretching slightly to an extent limited by the spacing of said seats to extend between the said projecting means in a direction substantially transverse to the direction of travel of said closure member during the valve seating operation occurring at end limits of said closure member travel and upon relative sliding movement taking place between the said inclined surfaces of the disc halves.

References Cited in the file of this patent

UNITED STATES PATENTS

| 114,338 | Pierce | May 2, 1871 |
| 650,989 | Ranoe | June 5, 1900 |
| 1,012,870 | Leitch | Dec. 26, 1911 |
| 1,801,361 | Moore | Apr. 21, 1931 |
| 2,504,924 | Fennema | Apr. 18, 1950 |